United States Patent [19]
Lovalenti et al.

[11] 3,981,180
[45] Sept. 21, 1976

[54] APPARATUS AND METHOD FOR MEASURING CONTAINER LEAN

[75] Inventors: Sam Lovalenti, Toledo, Ohio; Darius O. Riggs, Ottawa Lake, Mich.

[73] Assignee: Owens-Illinois, Inc., Toledo, Ohio

[22] Filed: May 1, 1975

[21] Appl. No.: 573,481

[52] U.S. Cl. .............................. 73/37.6; 33/174 Q
[51] Int. Cl.² ........................................ G01B 13/04
[58] Field of Search ........................ 73/37.5, 37.6; 33/174 Q, DIG. 2, 169 C; 324/103 P

[56] References Cited
UNITED STATES PATENTS

| | | | |
|---|---|---|---|
| 2,508,251 | 5/1950 | Ingle | 33/174 Q |
| 3,210,987 | 10/1965 | Bruns | 73/37.6 |
| 3,433,055 | 3/1969 | Booy et al. | 73/37.5 |
| 3,593,133 | 7/1971 | Wisner | 33/174 Q X |
| 3,768,010 | 10/1973 | Pozzetti | 324/103 P |
| 3,790,887 | 2/1974 | Rich | 324/103 P X |
| 3,878,984 | 4/1975 | Sotinopoulos et al. | 33/174 Q |

Primary Examiner—Richard C. Queisser
Assistant Examiner—John S. Appleman
Attorney, Agent, or Firm—S. M. McLary; E. J. Holler

[57] ABSTRACT

Apparatus and method for measuring the amount of lean present in a glass container. A glass container is mounted for rotation about its vertical axis. A pivotally mounted follower member is positioned to be in contact with the upper portion of the container. A fluidic position transmitter is mounted behind the follower and directs a stream of air from a nozzle against the rear face of the follower. The position transmitter will keep a constant gap between its nozzle and the follower by moving the nozzle. As the glass container is rotated, the follower will move in response to any deviation of the top portion thereof from a true vertical axis. The position transmitter will generate a back pressure signal in response to movement of its nozzle to maintain a constant spacing from the moving follower. This back pressure signal may then be processed to obtain a measure, in dimensional units, of the deviation of the top portion of the container from a true vertical axis.

9 Claims, 4 Drawing Figures

3,981,180

APPARATUS AND METHOD FOR MEASURING CONTAINER LEAN

BACKGROUND OF THE INVENTION

This invention generally relates to the inspection of glass containers for a condition known in the art as "leaner". More specifically, this invention relates to a laboratory instrument for measuring "leaner" conditions which is insensitive to operator variations. Most particularly, this invention relates to such an instrument which uses an air back pressure signal generated in response to movement of a follower member in contact with the container as the source of "leaner" information.

One of the defects which may occur in glass containers is that known as "leaner". A "leaner" is a glass container whose top portion is displaced or offset from the vertical center line of the entire container an excessive amount. This is an undesirable condition because it can create problems in filling and capping operations. The fill tubes for glass containers are designed to enter the container along the vertical center line of the container. If the top portion, including the finish, is offset an excessive amount from the center line, a possible jam condition exists. In the past, laboratory checks of selected samples from the manufacturing line for lean used a dial indicator system. This required operator readings of the dials and some skill to hold the container in the precise orientation required for repeatable readings. In addition, the operator had to manually divide the readings from the dial indicator by two. The result has been some variation in readings and a problem in comparing readings over a period of time. We have eliminated this problem by removing the necessity of operator interaction during the measurement process. Our instrument requires only that the operator chuck the container to be measured. Then, the movement of the top portion is measured as a function of a fluid back pressure which is then further processed to give a numerical read out equal to the actual lean or deviation from the vertical center line. One example of a prior art device may be seen in U.S. Pat. No. 3,289,834. Other devices to measure container lean are on line instruments and measure lean as the container is moving. Examples of such instruments may be seen in U.S. Pat. Nos. 3,548,890 and 3,754,123.

SUMMARY OF THE INVENTION

Our invention is an apparatus and method for measuring the deviation of the top portion of a glass container from the vertical center line of the glass container. The apparatus includes a rotatable turntable which carries a means for chucking the base portion of the glass container. A pivotally mounted follower is positioned to be in contact with the top portion of the glass container. A means is provided for sensing the movement of the follower to maintain contact with the glass container as the glass container is rotated and for generating a displacement signal as a function of this movement. A signal processing means connected to the generated displacement signal will generate an electrical output signal representative of the deviation of the top of the glass container from the vertical center line of the glass container.

DETAILED DESCRIPTION OF THE DRAWINGS

Figure 1:
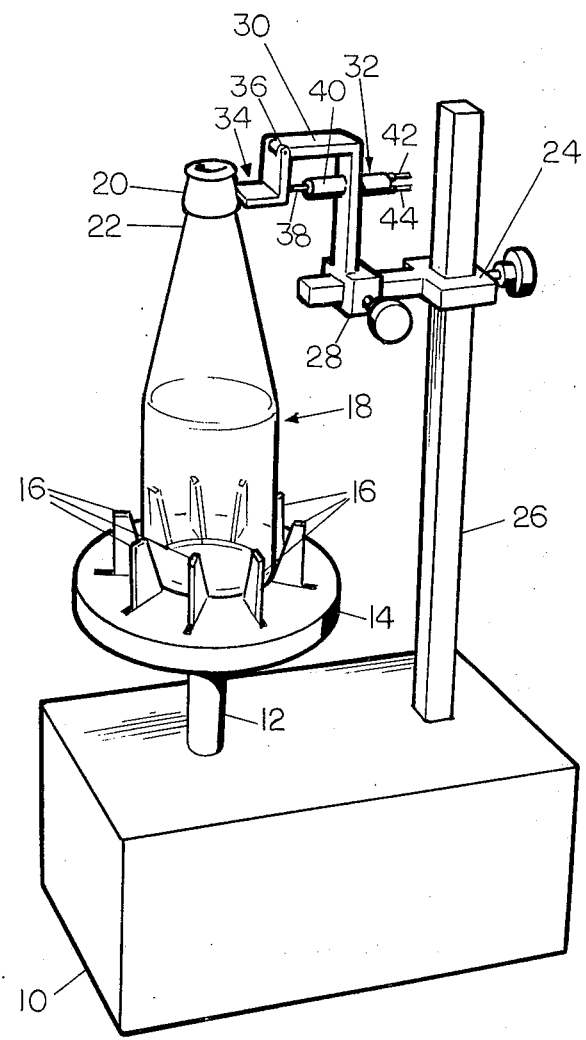
FIG. 1 is a perspective view of the apparatus of the present invention.

In FIG. 1, the apparatus of the present invention is shown in its operational configuration. The entire apparatus is mounted on an equipment enclosure box 10. Contained within the box 10 is a drive motor, which is not visible, which drives a shaft 12 which carries on its extending end a rotatable turntable 14. Mounted on the turntable 14 and shaft 12 is a means for chucking a glass container 18. This means includes fingers 16 which contact the bearing surface heel of the container 18. The fingers 16 are mounted on a collar (not visible) which slides on the shaft 12. A spring urges the collar and fingers 16 upward. The position of the fingers 16 is adjusted for each container 18 to be tested so that the spring load keeps the fingers 16 slightly above the point where the container 18 is securely chucked. When the container 18 is placed on the turntable 14, the fingers 16 are pressed down slightly against the spring load, and thus hold the container 18 securely in place. The bearing surface heel is one of the portions of the glass container 18 which may be made most dimensionally stable under almost all operating conditions. Therefore, the entire glass container 18 is centered in its vertical axis from this particular location. This apparatus is designed to determine the amount that the top portion of the glass container 18 deviates from the vertical centerline of the glass container 18. Thus, it is necessary that the glass container 18 be properly chucked to ensure that the lower most portion is in a generally stable configuration. Otherwise, undesirable variations in the measurement of the deviation of the upper portion of the glass container could be encountered. The upper most portion of the glass container is the finish portion 20. It is actually the deviation of the finish portion 20 from the vertical center line that is most important. This is an important dimension, since filling tubes in lines which fill the glass container 18 with a product are positioned to come vertically downward at a fixed location. If the finish 20 is not in this location, it may be struck by the fill tube thus causing a jam in the bottling line. The capping operation also requires that the finish 20 be in a fixed position for proper functioning. It would be possible to measure the deviation of a neck portion 22 as well as making the measurement from the finish portion 20. A vertical positioning support bracket 24 is adjustably mounted on a vertically extending column 26 which is attached to the box 10. A horizontal positioning support bracket 28 is attached to the vertical support bracket 24. As was the case with the vertical positioning support bracket 24, the horizontal positioning support bracket 28 is also adjustable to change its horizontal location relative to the glass container 18. The horizontal positioning support bracket 28 also carries a support member 30 on which is mounted a fluidic position transmitter 32 and a generally L shaped follower 34. The follower 34 is pivotally mounted to the support member 30 and is positioned to be in contact with the upper or top portion of the glass container 18, specifically with the finish portion 20. The follower 34 is connected to the support member 30 through a pivot pin 36. The fluidic position transmitter may be a doubled range unit of the general type designated as a model FGT-52 manufactured and sold by the Johnson Service Company, Milwaukee, Wisconsin, 53201. This device is manufactured such that an extending nozzle portion 38 will automatically maintain a constant distance from a fixed flat surface, such as the backside of the follower 34, regardless of the movement of the flat surface, within a specified range. To do this, the nozzle 38 moves in and out relative to the main body portion 40 of fluidic position transmitter 32. In this specific instance, the actual gap maintained between the back of the follower 34 and the outlet of the nozzle 38 is on the order of ten thousandths of an inch. The total range of movement available to the nozzle 38 is approximately two-hundred and eighty thousandths of an inch. It should be clear that the actual range of movement which may be sensed may be adjusted somewhat by changing the impingement point of the air from the nozzle 38 on the follower 34 relative to the pivot point of the follower 34. Supply air is furnished to the fluidic position transmitter 32 through an inlet supply line 42. As the nozzle 38 moves in response to movement of the surface which it is tracking, a back pressure signal will be generated and transmitted along an output pressure line 44. This back pressure signal is a measure of the amount of movement of the nozzle 38. It may be seen, therefore, that when air is allowed to escape from the nozzle 38, the pivotally mounted follower 34 will be pushed forward until it contacts the finish portion 20 of the glass container 18. The nozzle 38 will then maintain a constant spacing away from the backside of the follower 34 of approximately ten thousandths of an inch. As the glass container 18 is rotated, the follower 34 will be maintained in contact with the finish portion 20. If the finish portion 20 deviates from a true vertical center line position, the follower 34 will move in response to the movement of the finish portion 20. This will then cause generation of a back pressure signal along the output line 44 and this back pressure signal may then be used as a measure of the deviation of the top portion of the glass container 18 from a true vertical center line.

Figure 2:
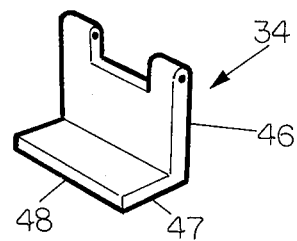
FIG. 2 is a perspective view, on an enlarged scale, of the follower member of the present invention.

FIG. 2 shows the follower 34 removed from its operational environment and on a somewhat enlarged scale. As was noted, the follower 34 is basically L shaped having a leg portion 46 and a foot portion 47. The foot portion 47 terminates in a generally flat edge 48 which is actually in contact with the finish portion 20. The purpose of using the follower 34 is to present a substantially flat surface for impingement of the air stream from the nozzle 38. The curved surface of the finish portion 20 usually does not present a sufficiently flat surface to ensure absolute accuracy of the impingement of the air stream from the nozzle 38. In addition, the movement of the finish portion 20 of the glass container 18 could be sufficient to actually bring it outside of the range of a fixed jet issuing from the nozzle 38. Thus, it may be seen that the follower 34 is a relatively elongated member and may therefore track a relatively wide range of deviation of the finish portion 20 from a true vertical center line. In order to maintain contact with the finish portion 20 throughout the entire expected range of possible deviation, the longitudinal dimension of the foot portion 47 should be made slightly greater than the expected maximum deviation in each direction, in this case about 0.60 inches total.

Figure 3:
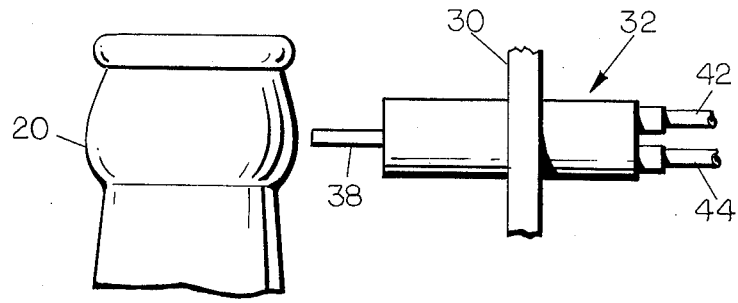
FIG. 3 is a partial, side elevational view of a slightly modified embodiment of the invention shown in FIG. 1, eliminating the follower member.

FIG. 3 illustrates a modification of the system shown in FIG. 1. The basic change is the elimination of the follower 34. The same position transmitter 32 may be used. In this case, the air stream from the nozzle 38 impinges directly on the finish portion 20. This particular embodiment can be very useful where a true non-contacting measurement device is needed, for example in measuring hot glass containers 18. The disadvantage of this embodiment is that the range of deviation which can be measured is usually not much more than 0.100 inches in either direction. The use of the follower allows extending this range to at least 0.280 inches in each direction, and even beyond this range, as has been previously explained.

Figure 4:
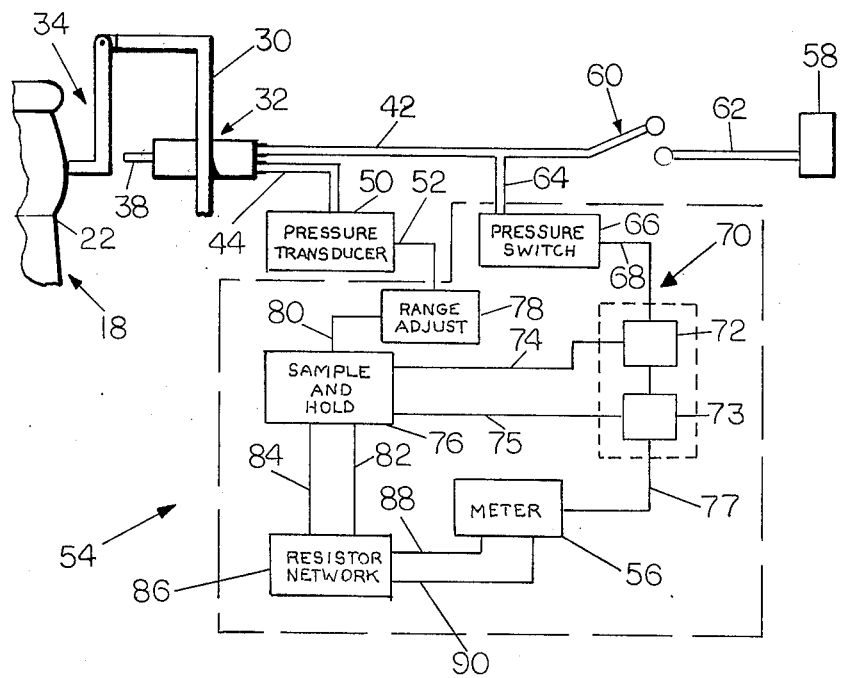
FIG. 4 is a schematic, block diagram, with the size of some elements distorted, illustrating the entire signal processing system of the present invention.

FIG. 4 shows in a schematic block diagram form the processing of the signal which is generated as a result of movement of the follower 34. This system would also work with the embodiment of FIG. 3. In FIG. 4, the actual size of the finish portion 20 and the follower 34 and fluidic position transmitter 32 are somewhat distorted relative to the other components simply to further emphasize the positional relationship of these elements. In addition, the actual gap between the nozzle 38 and the back portion of the follower 34 is shown as being much greater than it actually is, again to emphasize the point that a gap does exist. The output line 44 is connected to an input of a pressure transducer 50 which generates an electrical signal that is porportional to the back pressure signal that it receives. This electrical signal is transmitted along a conductor 52 to a signal processing means 54. The signal processing means 54 is designed to generate an electrical output signal that is representative of the deviation of the top of the glass container 18 from its vertical center line. An output meter 56 is used to display the actual deviation of the top of the glass container 18. The inlet supply line 42 is furnished with air under pressure, preferably of about 20 lbs. per square inch, from a source of compressed air 58. The source of compressed air 58 is connected to one port of a fluidic type toggle switch 60 by a pipeline 62. During the time that the glass container 18 is being engaged by the spring loaded fingers 16, the toggle switch 60 is connected to a port which allows the inlet line 42 to be vented. When it is desired to begin the test, the toggle switch 60 is moved so that it is connected to the pipeline 62 thus allowing air to enter the inlet pipeline 42. When this occurs, a branch pipeline 64 that is connected to the inlet pipeline 42 transmits this pressure signal to a pressure switch 66. The pressure switch 66 then generates an electrical signal in response to this pressure input to it and transmits this signal along an output conductor 68. The output conductor 68 is connected to a trigger circuit 70. The trigger circuit 70 is basically composed of two time delay type circuits 72 and 73. At the time the air is first presented to the inlet pipeline 42, the nozzle 38 is in a retracted position and the follower 34 is not necessarily in contact with the finish portion 20. The glass container 18 may be rotating at this time, but any signal that would be received would not necessarily be an accurate representation of the condition of the glass container 18. Thus, the first time delay, provided by the time delay circuit 72, is designed to allow the follower 34 to be moved out into position against the finish 20 and allow the nozzle 38 to reach a stabilized position relative to the back of the follower 34. When this time delay begins, and this delay is typically on the order of one to two seconds, an output signal is generated along a conductor 74 and transmitted to a sample and hold unit 76. The sample and hold unit 76 is a conventional and well known type which will hold both the maximum and the minimum values that are presented to it during a sample time period and then present these values as constant outputs until reset. The signal from the first time delay circuit 72 will reset the sample and hold unit 76 to accept new values. Expiration of the first time delay period, which is pre-selected but adjustable, will cause triggering of the second time delay circiut 73. The second circuit 73 has a delay period which is tied to the speed of rotation of the glass container 18. Generally, the delay period is set to allow 370° of rotation of the glass container 18. As the delay period set by the second circuit 73 begins, a signal is generated on a conductor 75 to the sample and hold unit 76. This allows the sample and hold unit 76 to sample incoming signals. In addition, a signal on a conductor 77 connected to the meter 56 will blank the meter 56 during the delay period. That is, the meter 56 will not display a new value until after the time period has expired. At the expiration of the second preselected time period, the signal on the conductor 75 to the sample and hold unit 76 will cease, thus blocking further signals from entry thereto and placing the sample and hold unit 76 in its hold mode. The signal on the conductor 77 blanking the meter 56 will also cease, allowing the meter to display a new number. The sample and hold unit 76 is furnished a signal along a conductor 80 from a range adjustment circuit 78. The range adjustment circuit 78 is designed to condition the electrical signal from the pressure transducer to compensate for zero offset of the pressure transducer and calibration settings. There are two output signals from the sample and hold unit 76. One signal is transmitted along an electrical conductor 82 and is the maximum value. The other value is transmitted along a conductor 84 and is the minimum value. These signals, of course, represent the actual movement of the glass container finish 20 about the desired vertical center line. Since it is desired to have as a number on the output meter 56 the actual deviation of the centerline of the finish 20 from the center line, it is necessary to adjust the voltage signals presented by the sample and hold unit 76 to get this numerical value. The actual factors which are involved are as follows: The back pressure that may be sensed by the pressure transducer is between 0 and 20 lbs. per square inch; the output of the pressure transducer 50 is preferably set between 0 and 5 volts for this 0 to 20 lbs. per square inch range; and the range of travel of the nozzle 38 is 0.280 inches. It may be seen that when all of these factors are taken into account the output of the pressure transducer 50 that is transmitted to the sample and hold unit 76 is a number which is representative of the actual deviation of the finish portion 20 from a true vertical center line but is not necessarily equal in numerical value to this deviation in dimensional units such as inches or centimeters. Therefore, the output conductors 82 and 84 are connected to a resistor network 86 which is a simple means to scale the values of the maximum and minimum signals to bring them to voltage levels numerically equal to their values in distance units. This output value is carried along electrical conductors 88 and 90 and is furnished to the meter 56. The meter 56 is preferably a Model AN-2510A manufactured by Analogic Company, Wakefield, Massachusetts, 01880. This meter has differential input terminals to which the conductors 88 and 90 are connected. This meter is so constructed that it will display the difference of any signals connected to the differential terminals. In this case, this will be the difference between the maximum and minimum deviation values presented on the conductors 88 and 90. Since by definition a glass container leaner is the actual deviation to only one side of the vertical center line, the voltage values carried by the conductors 82 and 84 are actually twice the desired numerical result. The resistor network 86 may, in addition to performing the scaling function, also act as a voltage divider to divide both values by two. The final result displayed by the meter 56 is one-half the full range of the deviation of the finish portion 20 from the vertical center line, in distance units, which is defined as the lean of the glass container 18.

What we claim is:

1. Apparatus for measuring the deviation of the top portion of a glass container from the vertical center line of said glass container which comprises, in combination:

a rotatable turntable;

means for chucking a lower base portion of said glass container on said turntable;

a pivotally mounted follower positioned in contact with the top portion of said glass container;

means for sensing the movement of said follower to maintain contact with said glass container as said glass container is rotated and for generating a displacement signal as a function of said movement, said means for sensing the movement of said follower and for generating a displacement signal as a function thereof including;

a fluidic position transmitter, positioned to impinge a jet of air on the back surface of said follower, said position transmitter generating a back pressure signal as a function of the movement of said follower;

a source of air under pressure connected to said fluidic position transmitter; and a pressure transducer, responsive to said back pressure signal, for generating an electrical displacement signal proportional to said back pressure signal;

a fluidic toggle switch connected in series between said fluidic position transmitter and said source of air for selectively disconnecting said source of air from said fluidic position transmitter; and signal processing means, connected to receive said generated displacement signal, for generating an electrical output signal representative of the deviation of the top of said glass container from the vertical center line thereof, said signal processing means including;

a pressure switch, connected to receive air when said toggle switch is positioned to allow air to flow to said fluidic position transmitter and generate an electrical signal whenever air is furnished thereto; and a timing circuit, connected to the electrical signal output of said pressure switch, for generating a first electrical signal at the beginning of a first preselected time period to clear said signal processing means of any previous values of said displacement signal and to allow said fluidic position transmitter to reach a stable position and for generating a second electrical signal at the end of said first preselected time period to allow said signal processing means to accept new values of said displacement signal only during a second preselected time period.

2. The apparatus of claim 1 wherein said signal processing means includes further:
a range adjustment circuit, connected to receive said displacement signal, for conditioning said displacement signal; and
a sample and hold circuit, connected to said range adjustment circuit, for holding and presenting as a constant output signal the minimum and the maximum values of said displacement signal, as conditioned by said range adjustment circuit, for each cycle of said apparatus.

3. The apparatus of claim 2 wherein said signal processing means further includes:
a resistor network, connected to both output signals of said sample and hold circuit, for scaling the values of said minimum and maximum displacement signals to voltage levels numerically equal to their values in distance units and presenting these scaled voltages as output signals.

4. The apparatus of claim 3 wherein said signal processing means further includes:
an output volt meter, having differential input terminal connections, connected to both outputs of said resistor network, whereby said output volt meter will display a value numerically equal to the difference between said minimum and maximum displacement signals in distance units.

5. The apparatus of claim 1 further characterized in that said follower is a generally L shaped member, the foot portion thereof being positioned in contact with said glass container.

6. Apparatus for measuring the deviation of the top portion of a glass container from the vertical center line of said glass container which comprises, in combination:
a rotatable turntable;
means for chucking a lower base portion of said glass container on said turntable;
fluidic means for sensing the movement of the top portion of said glass container relative to the vertical center line thereof and for generating a displacement signal as a function of said movement, said means for sensing the movement of said top portion and for generating a displacement signal as a function thereof including;
a fluidic position transmitter, positioned to impinge a jet of air on said top portion of said glass container, said position transmitter generating a back pressure signal as a function of the movement of said top portion;
a source of air under pressure connected to said fluidic position transmitter; and
a pressure transducer, responsive to said back pressure signal, for generating an electrical displacement signal proportional to said back pressure signal;
a fluidic toggle switch connected in series between said fluidic position transmitter and said source of air for selectively disconnecting said source of air from said fluidic position transmitter; and
signal processing means, connected to receive said generated displacement signal, for generating an electrical output signal representative of the deviation of the top of said glass container from the vertical center line thereof, said signal processing means including;
a pressure switch, connected to receive air when said toggle switch is positioned to allow air to flow to said fluidic position transmitter and generate an electrical signal whenever air is furnished thereto; and
a timing circuit, connected to the electrical signal output of said pressure switch, for generating a first electrical signal at the beginning of a first preselected time period to clear said signal processing means of any previous values of said displacement signal and to allow said fluidic position transmitter to reach a stable position and for generating a second electrical signal at the end of said first preselected time period to allow said signal processing means to accept new values of said displacement signal only during a second preselected time period.

7. The apparatus of claim 6 wherein said signal processing means includes further:
a range adjustment circuit, connected to receive said displacement signal, for conditioning said displacement signal; and
a sample and hold circuit, connected to said range adjustment circuit, for holding and presenting as a constant output signal the minimum and the maximum values of said displacement signal, as conditioned by said range adjustment circuit, for each cycle of said apparatus.

8. The apparatus of claim 7 wherein said signal processing means further includes:
a resistor network, connected to both output signals of said sample and hold circuit, for scaling the values of said minimum and maximum displacement signals to voltage levels numerically equal to their values in distance units and presenting these scaled voltages as output signals.

9. The apparatus of claim 8 wherein said signal processing means further includes:
an output volt meter, having differential input terminal connections, connected to both outputs of said resistor network, whereby said output volt meter will display a value numerically equal to the difference between said minimum and maximum displacement signals in distance units.

* * * * *